(12) United States Patent
Reichert

(10) Patent No.: US 8,146,728 B2
(45) Date of Patent: Apr. 3, 2012

(54) ACTUATING ELEMENT FOR THE PARKING LOCK OF A TRANSMISSION AND PARKING LOCK FOR A TRANSMISSION

(75) Inventor: Heinz Reichert, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 610 days.

(21) Appl. No.: 12/304,824

(22) PCT Filed: Jun. 29, 2007

(86) PCT No.: PCT/EP2007/056547
§ 371 (c)(1),
(2), (4) Date: Dec. 15, 2008

(87) PCT Pub. No.: WO2008/003649
PCT Pub. Date: Jan. 10, 2008

(65) Prior Publication Data
US 2009/0173584 A1    Jul. 9, 2009

(30) Foreign Application Priority Data
Jul. 5, 2006  (DE) .................. 10 2006 030 998

(51) Int. Cl.
*B60T 1/06* (2006.01)
(52) U.S. Cl. ......... 192/219.5; 188/31; 74/411.5; 74/569

(58) Field of Classification Search .......... 192/219.5
See application file for complete search history.

(56) References Cited

U.S. PATENT DOCUMENTS

| | | | | | |
|---|---|---|---|---|---|
| 2,974,752 | A | * | 3/1961 | Howard | 188/69 |
| 3,043,403 | A | * | 7/1962 | Kelley | 188/69 |
| 3,407,011 | A | * | 10/1968 | Zeidler | 384/54 |
| 5,295,412 | A | * | 3/1994 | Donato et al. | 74/577 R |
| 5,685,406 | A | * | 11/1997 | Crum et al. | 192/219.5 |
| 5,934,436 | A | | 8/1999 | Raszkowski et al. | |

FOREIGN PATENT DOCUMENTS

| | | |
|---|---|---|
| DE | 101 31 735 A1 | 1/2003 |
| DE | 101 44 063 A1 | 3/2003 |
| DE | 10 2005 051 266 A1 | 5/2006 |
| EP | 0 823 359 A1 | 2/1998 |
| EP | 0 895 908 A1 | 2/1999 |
| FR | 2 878 487 A1 | 6/2006 |

\* cited by examiner

*Primary Examiner* — Richard M. Lorence
(74) *Attorney, Agent, or Firm* — Davis & Bujold, P.L.L.C.

(57) ABSTRACT

A transmission parking lock and an actuating element (1) for the parking lock. The actuating element includes a pull rod (2) and a roller carrier (3) on which are arranged a first roller (13) for rolling on a first rolling surface on the pawl of the parking lock and a second roller (14) for rolling on a second rolling surface on a guide element, such that the roller carrier (3) can be moved along a predetermined path in the longitudinal direction of the pull rod (2). The roller carrier (3) can move longitudinally on the pull rod (2).

16 Claims, 4 Drawing Sheets ized on the pivotable pawl of the parking lock and a second roller for rolling on a second rolling surface on a guide element are arranged so that the roller carrier can move along a predetermined path in the longitudinal direction of the positioning rod. The present invention also concerns a parking lock for a transmission having an actuating element of the type.

BACKGROUND OF THE INVENTION

From the prior art, various parking locks for automatic transmissions are known. DE 101 44 063 B4 describes a parking lock which comprises a pawl and a retaining ring on the drive output shaft of an automatic transmission. The pawl can be pivoted from a neutral position to a locking position in which the pawl engages in a retaining recess in the retaining ring and so locks the drive output shaft. To actuate the pawl a pivotable selector lever is provided to which a positioning rod is articulated on which, in turn, two rollers are arranged, which cannot be displaced but can rotate. The positioning rod and the rollers form an actuating element. By swiveling the selector lever, the positioning rod is moved. When the positioning rod moves, the first roller rolls along a fixed wall while the second roller rolls along a ramp of the pawl. By way of the support of the first roller against the fixed wall and the rolling of the second roller up the ramp, the pawl is pivoted in the direction of the retaining ring into its locking position.

From DE 101 31 735 A1, a similar parking lock is known, whose structure, however, is more complex. In this case, the two rollers are not arranged on the positioning rod, but on an actuating carrier which, moreover, is guided and moves within a guide fixed to the housing. The positioning rod, the actuating carrier with the rollers and the guide fixed to the housing form an actuating element. The control is only connected with the actuating carrier inasmuch as the movement of the positioning rod can be transferred to the actuating carrier when the positioning rod is displaced. Furthermore, the actuating carrier can be displaced, relative to the positioning rod along a predetermined path in the longitudinal direction of the latter. The actuating carrier is pre-stressed in a predetermined position relative to the positioning rod. If the pawl, when it pivots, encounters a retaining tooth of the retaining ring, then although the positioning rod can be moved, the actuating carrier is at first only displaced relative to the positioning rod, until the pawl encounters a retaining recess in which it can engage. When this happens, then owing to the pre-stress, the actuating carrier is also moved to its original position in which it presses or swivels the pawl into the locking position.

Although the aforesaid prior art has the advantage that the ability of the actuating carrier to move longitudinally also enables the positioning rod to be displaced when the pawl is resting directly on a retaining tooth, it also has disadvantages.

The actuating carrier comprises several components with various connection points so the design is expensive and prone to malfunction. Furthermore, the known actuating element takes up considerable structural space so that it cannot be used for axial pawl actuation or only so with difficulty.

Accordingly, the purpose of the present invention is to provide an actuating element for the parking lock of a transmission, which can be made easily, is not prone to malfunction and takes up little structural space. A further purpose of the invention is to provide a parking lock with an advantageous actuating element of that type.

SUMMARY OF THE INVENTION

The actuating device, according to the invention, for the parking lock of a transmission comprises a positioning rod and a roller carrier. A first roller and a second roller are arranged on the roller carrier. The first roller can roll on a first rolling surface on a pivotable pawl of the parking lock. The second roller can roll on a second rolling surface on a guide element. Such a guide element can be a fixed guide element which, moreover, can be formed as part of the housing or attached permanently to the latter. The roller carrier can move along a predetermined path in the longitudinal direction of the positioning rod. However, in contrast to the actuating element known from DE 101 31 735 A1, the roller carrier is not arranged in a separate guide on the housing, but can move longitudinally along the positioning rod itself.

The invention has the advantage that no or no elaborate guide on the housing is needed for the roller carrier since this is guided on the positioning rod itself. This reduces the number of components and corresponding connection points so that the actuating element as a whole is less prone to malfunction and takes up less structural space. The latter characteristic, in particular, makes it possible to use the actuating element in a parking lock with axial pawl actuation. Furthermore, owing to the compact design, the positioning rod of the actuating element can even have several bends in it and does not have to be straight. This enables the positioning rod to be located almost anywhere within the parking lock so that the other parts of the device, such as the selector shaft and the retaining disk, can be positioned virtually as desired.

To enable particularly secure guiding of the roller carrier on the positioning rod, in a preferred embodiment of the actuating element, the positioning rod extends completely through the roller carrier regardless of the position of the roller carrier on the positioning rod.

So that the first and the second roller can roll on the corresponding rolling surfaces uninfluenced by the positioning rod, in a further preferred embodiment of the actuating element, the positioning rod extends between the first and the second roller. In this way, the first and the second roller can roll on the rolling surfaces on their sides facing away from the positioning rod.

In another advantageous form of the actuating device, the first and second rollers have rolling surfaces and the positioning rod extends between those rolling surfaces. In this case, the positioning rod preferably extends in the middle between the rolling surfaces. This central arrangement enables a particularly uniform force transfer from the positioning rod to the roller carrier and secure rolling of the rollers.

To be able to arrange the rollers particularly close to one another, in an especially preferred embodiment of the actuating element, an all-round groove is provided in at least the first or the second roller through which the positioning rod extends. This enables the rollers to be arranged so close together that the roller carrier with the rollers can be made particularly small, which reduces the structural space needed.

In a further advantageous embodiment of the actuating element, the all-round groove has a curved, preferably semicircular cross-section. This makes the force flow within the rollers more uniform and if both rollers have corresponding all-round grooves, a positioning rod with a circular cross-section can be passed between them with a close fit.

In a further preferred form of the actuating element, a first all-round groove is provided in the first roller and the second all-round groove in the second roller so that the positioning rod extends through the first and the second grooves. This enables the positioning rod to be passed centrally between the axes of the two rollers thus ensuring a more secure guiding of the roller carrier and uniform force transfer from the positioning rod to the roller carrier.

For this purpose, in a further advantageous form of the actuating element, the first all-round groove and the second all-round groove are positioned opposite one another.

Furthermore, and for the same purpose, as another preferred feature of the actuating element, the first and the second all-round grooves are formed centrally in the rolling surfaces of the first and the second rollers.

To be able to pass a positioning rod with a circular cross-section through the all-round grooves without interference, as a further advantageous feature of the invention, the first and the second all-round grooves form a conjoint, cross-section of essentially circular shape.

To secure the roller carrier on the positioning rod, in a further preferred embodiment of the actuating element, a first, radially projecting end-stop is provided on the positioning rod against which the roller carrier is pre-stressed.

In another preferred embodiment of the actuating element, a radially projecting, second end-stop is also provided on the positioning rod and a compression spring is arranged between the second end-stop and the roller carrier by way of which the roller carrier is pre-stressed against the first end-stop. The compression spring is preferably a spiral spring coiled around the positioning rod, since a particularly compact structure can be achieved in this way.

The parking lock comprises the actuating element as described above.

In a preferred embodiment of the parking lock, the parking lock comprises a pivotable pawl and a toothed parking-lock wheel connected rotationally fixed to the drive output shaft of a transmission such that the positioning rod with the roller carrier can be moved from a first position in which the drive output shaft is not locked to a second position in which the first roller rests on the pawl and the second roller on a guide element in such a manner that the pawl engages with the toothed parking-lock wheel.

In an advantageous design form of the parking lock, a first rolling surface is provided on the pawl for the first roller to roll on and a second rolling surface is provided on the guide element for the second roller to roll on. The first and/or the second rolling surface can have an inclined or ramp-like shape.

Since in the case of a parking lock with axial pawl actuation, particularly little structural space is available in an especially preferred embodiment of the parking lock, the pawl can be pivoted about a pivot axis and, when the positioning rod is moved from the first to the second position, the roller carrier can move relative to the pivot axis in the axial direction between the guide element and the pawl. With such a parking lock, the advantages of the actuating element, namely its compact structure, come particularly into their own.

BRIEF DESCRIPTION OF THE DRAWINGS

The invention will now be described, by way of example, with reference to the accompanying drawings in which.

DETAILED DESCRIPTION OF THE INVENTION

Figure 1:
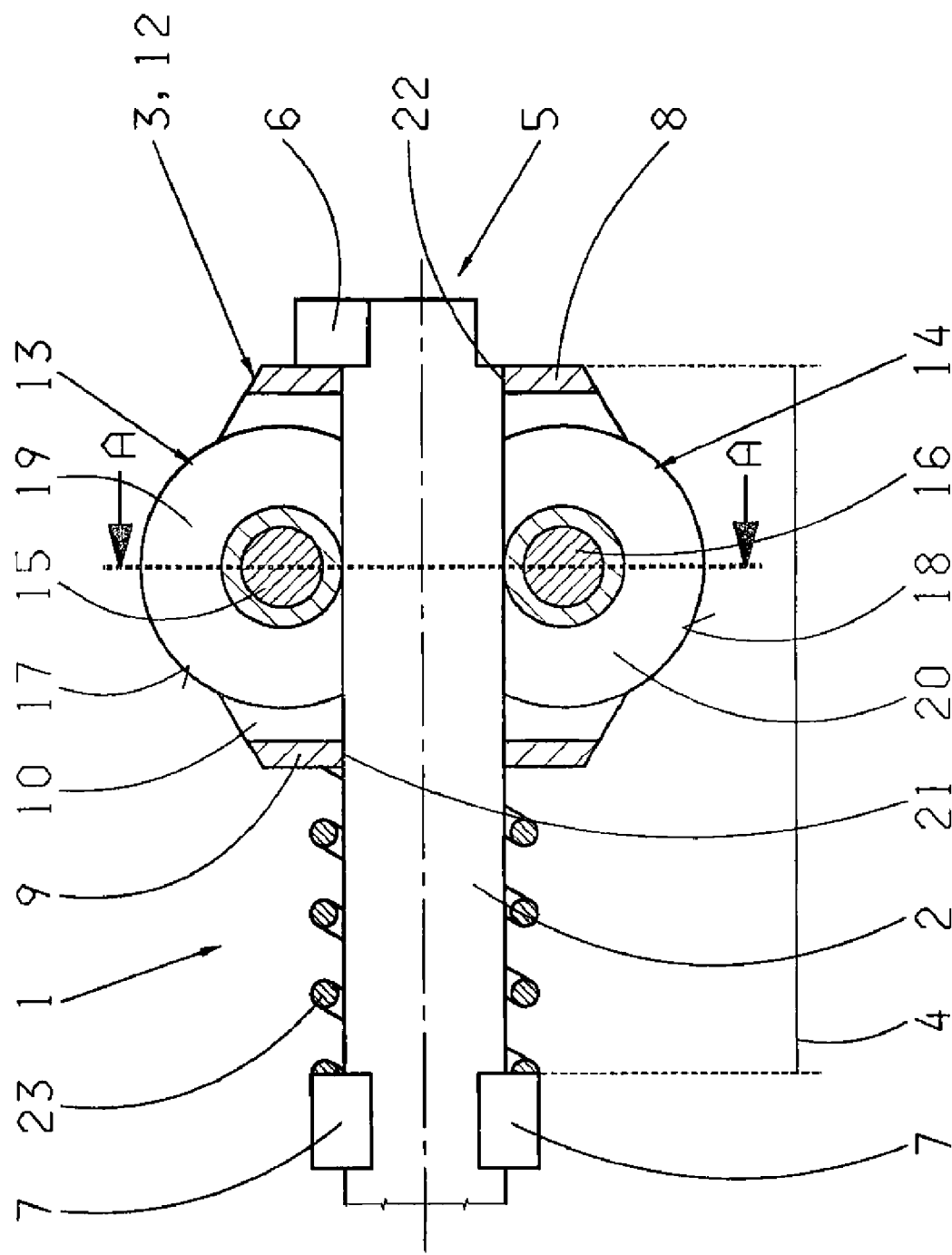
FIG. 1 is a partial side view of an embodiment of the actuating element, shown in section according to the invention.
Figure 2:
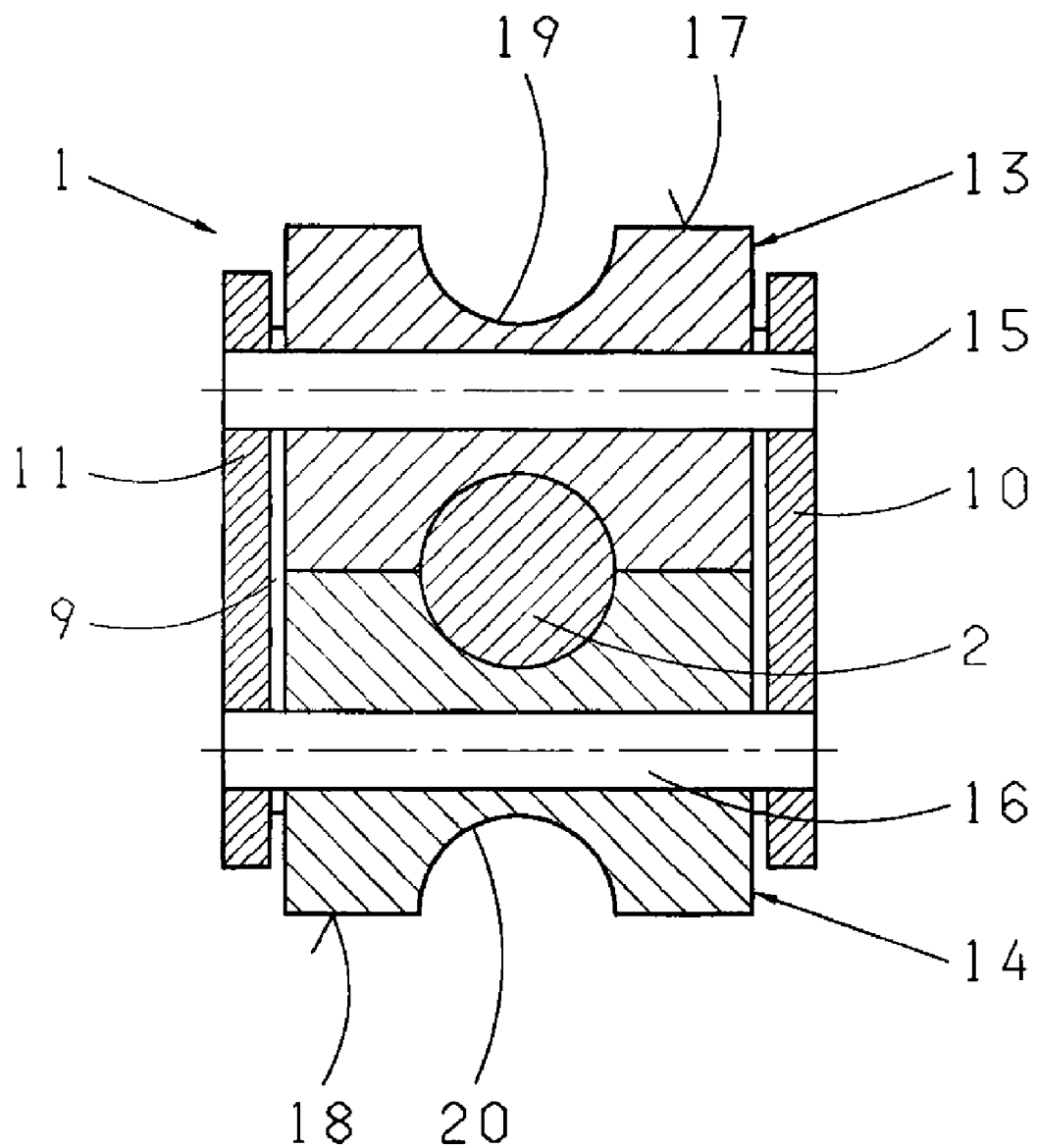
FIG. 2 is a view along the section line A-A in FIG. 1, seen from above.

FIGS. 1 and 2, first, show an embodiment of the actuating element 1 for a parking lock of a transmission. The parking lock is described in more detail later with reference to FIGS. 3 and 4. The actuating element 1 comprises a positioning rod 2 and a roller carrier 3. The positioning rod 2 has a straight end section 4 at whose free end 5, a radially projecting first end-stop 6 and, at whose other end, are formed a radially projecting second end-stop 7.

The roller carrier 3 has a front wall 8, a rear wall 9 opposite the front wall 8 and two sidewalls 10, 11 opposite one another, which together form a housing 12 open at the top and bottom. Inside the roller carrier 3 are arranged a first roller 13 and a second roller 14. The first roller 13 is mounted to rotate on a first spindle 15 and the second roller 14 is mounted to rotate on a second spindle 16. The first and the second spindles 15, 16 are parallel to one another. As can be seen particularly clearly in FIG. 2, the two spindles 15, 16 are each fixed on the sidewalls 10, 11. The first spindle 15 and the second spindle 16 are arranged on the sidewalls 10, 11 in positions such that the first roller 13 projects upward and the second roller 14 downward out of the housing 12 so that the respective rolling surfaces 17, 18 at the circumferences of the rollers 13, 14 project outward. The spindles 15, 16 can also be integrally joined with the rollers 13, 14 and engage in the sidewalls 10, 11 as pins.

In the rolling surface 17 of the first roller 13, a centrally positioned, first all-round groove 19 is provided, while in the rolling surface 18 of the second roller 14, a centrally positioned, second all-round groove 20 is formed. The term "centrally" referring here to the width direction of the rollers 13, 14 between the two sidewalls 10, 11. Both the first and the second all-round grooves 19 and 20 have a curved, in this example a semicircular cross-section, as can be seen in FIG. 2. Moreover, the first and the second all-round grooves 19, 20 are positioned opposite one another in the rolling surfaces 17, 18 of the rollers 13, 14 so that the first all-round groove 19 and the second all-round groove 20, with their sides facing toward one another, form a conjoint cross-section which is of essentially a circular shape.

As shown in FIG. 1, in the rear wall 9 and in the front wall 8 of the roller carrier 3, there is, in each case, a centrally positioned, circular opening 21, 22, whose diameters are approximately that of the positioning rod 2. The positioning rod 2, or its end section 4, extends completely through the roller carrier 3, i.e., the positioning rod 2 passes through the opening 21 in the rear wall 9, between the first and the second rollers 13, 14 through the first and second all-round grooves 19, 20 and then through the opening 22 in the front wall 8. Thus, in the area of the openings 21, 22, the roller carrier 3 is guided and can move longitudinally on the positioning rod 2 between the first and the second end-stops 6 and 7. Furthermore, the distance between the end-stops 6, 7 determines a path length along which the roller carrier 3, guided on the positioning rod 2, can move.

In addition, a compression spring 23 is arranged between the second end-stop 7 and the rear wall 9 of the roller carrier 3 so that the roller carrier 3 is pre-stressed with its front wall 8 against the first end-stop 6. The compression spring 23 is a spiral spring coiled around the positioning rod 2 in the area of its end section 4 so that a particularly compact arrangement is produced.

Figure 3:
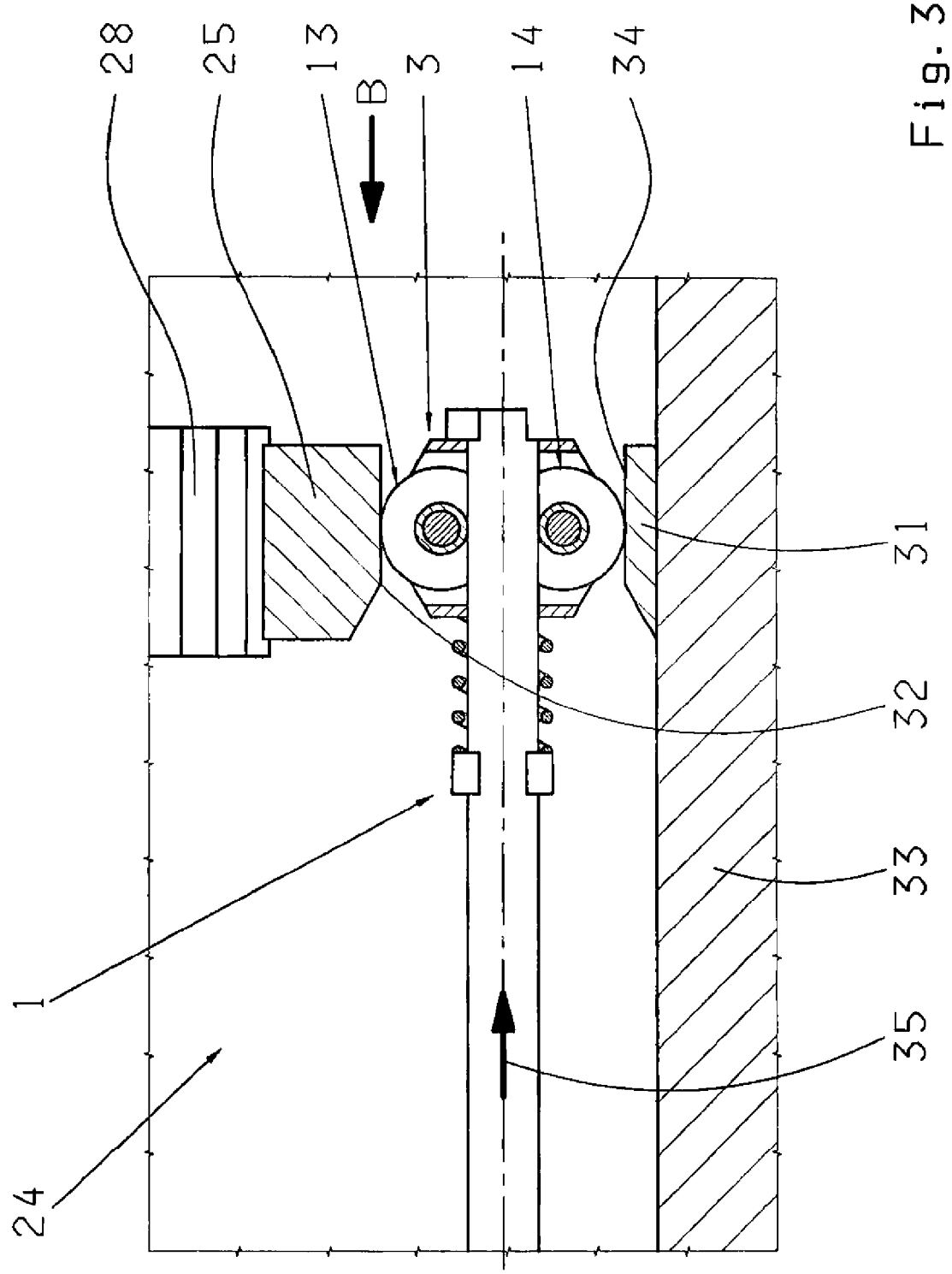
FIG. 3 is a partial side view of an embodiment of the parking lock with the actuating element of FIGS. 1 and 2 shown in section.
Figure 4:
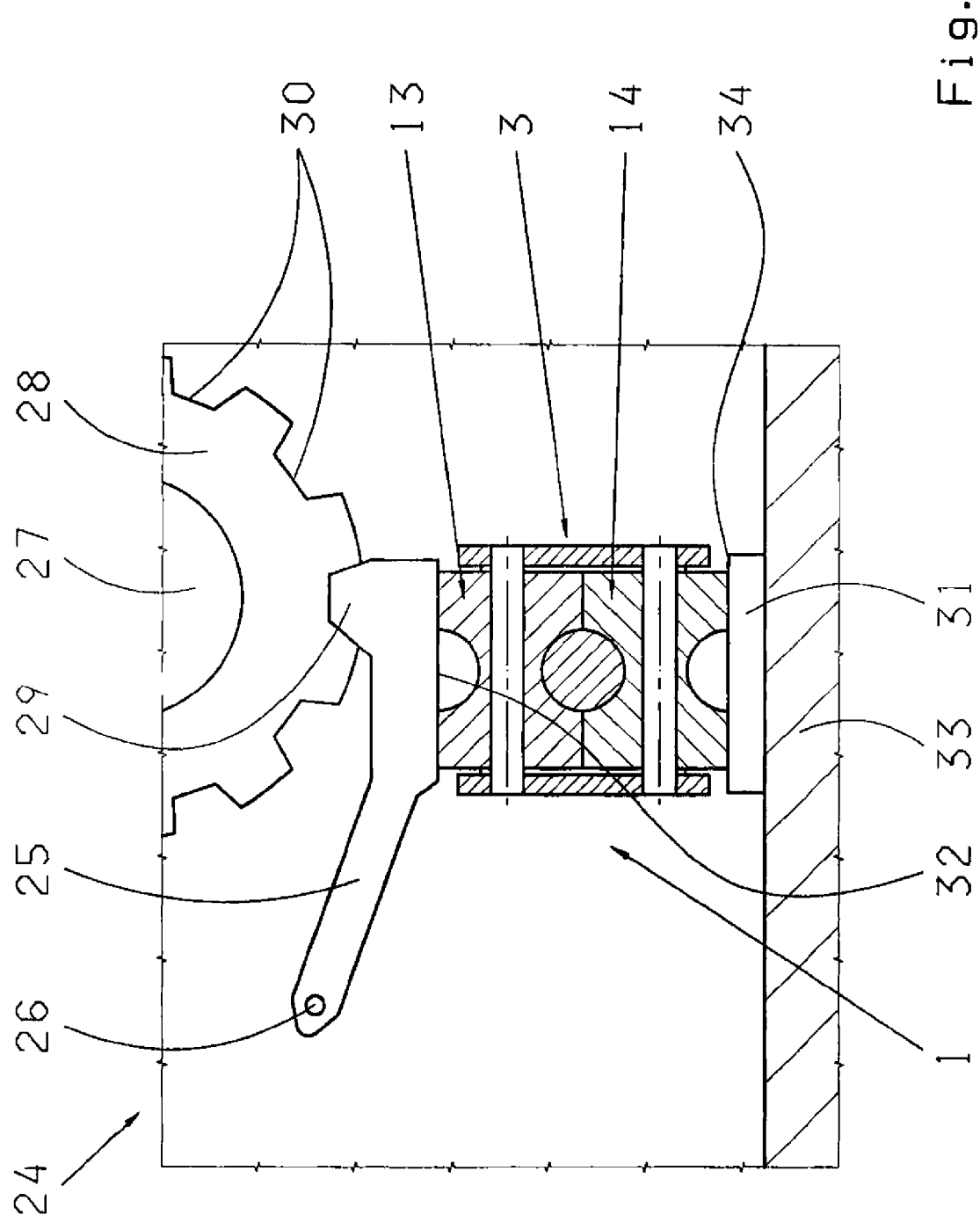
FIG. 4 is a view along the direction of the arrow B in FIG. 3, shown partially in section.

FIGS. 3 and 4 show an embodiment of a parking lock 24 with the actuating element 1 described above. The parking lock 24 comprises a pawl 25 which can pivot about a pivot axis 26. In addition, a toothed parking-lock wheel 28, connected in a rotationally fixed manner to a drive output shaft 27 of an automatic transmission (not shown), is provided. The pivot axis 26 of the pawl 25 and the longitudinal axis (not indexed) of the drive output shaft 27 extend parallel to one another. On the side of the pawl 25, a retaining tooth 29 is also arranged, facing toward the circumference of the toothed parking-lock wheel 28, while around the circumference of the toothed parking-lock wheel 28, corresponding retaining recesses 30 are provided. On the side of the pawl 25, facing away from a retaining tooth 29 and toward a guide element 31, a first rolling surface 32 is provided. On the housing of the parking lock 24, indexed 33 in the Figures, is attached the fixed guide element 31. On its side facing toward the pawl 25, the guide element 31, opposite the pawl 25, has a second rolling surface 34, which—like the first rolling surface 32—is in the form of a ramp.

The end of the positioning rod 2, remote from the roller carrier 3, is connected to a retaining disk (not shown), which can be rotated by a selector lever so that when the selector lever is correspondingly turned, the positioning rod 2 can be moved in the direction of an arrow 35 from a first position, in which the drive output shaft 27 is not locked, to a second position, which is shown in FIGS. 3 and 4. By way of this movement of the positioning rod 2, together with the roller carrier 3, the first roller 13 rolls over the ramp-like rolling surface 32 on the pawl 25, while the second roller 14 rolls up the ramp-like rolling surface 34 on the guide element 31. Since the rollers 13, 14 are pushed, between the guide element 31 on one side and the pawl 25 on the other side, the pawl 25 swivels about its pivot axis 26 until the retaining tooth 29 of the pawl 25 engages in one of the retaining recesses 30. In this second position, therefore, the drive output shaft 27 of the automatic transmission is locked and further rotation thereof is prevented.

The illustrated parking lock 24 makes use of the axial pawl actuation. In this, relative to the pivot axis 26 of the pawl 25, the roller carrier 3 with its rollers 13, 14, is moved in the axial direction between the guide element 31 and the pawl 25 in order to swivel the pawl 25. Since particularly little structural space is available with the parking lock 24 of this type, the advantages of the actuating element 1 come particularly into their own.

| Reference numerals | |
|---|---|
| 1 | actuating element |
| 2 | positioning rod |
| 3 | roller carrier |
| 4 | end section |
| 5 | free end |
| 6 | first end-stop |
| 7 | second end-stop |
| 8 | front wall |
| 9 | rear wall |
| 10 | sidewall |
| 11 | sidewall |
| 12 | housing of the roller carrier |
| 13 | first roller |
| 14 | second roller |
| 15 | first spindle |
| 16 | second spindle |
| 17 | first rolling surface |
| 18 | second rolling surface |
| 19 | first all-round groove |
| 20 | second all-round groove |
| 21 | opening |
| 22 | opening |
| 23 | compression spring |
| 24 | parking lock |
| 25 | pawl |
| 26 | pivot axis |
| 27 | drive output shaft |
| 28 | toothed parking-lock wheel |
| 29 | retaining tooth |
| 30 | retaining recess |
| 31 | guide element |
| 32 | first rolling surface |
| 33 | housing of the parking lock |
| 34 | second rolling surface |
| 35 | arrow |

The invention claimed is:

1. An actuating element for a parking lock of a transmission, the actuating element comprising:
a pull rod (2) and a roller carrier (3) on which are arranged a first roller (13) for rolling on a first rolling surface, on a pivotable pawl of the parking lock, and a second roller (14) for rolling on a second rolling surface, on a guide element, such that the roller carrier (3) is movable along a predetermined path in a longitudinal direction of the pull rod (2),
the pull rod (2) extending between the first roller (13) and the second roller (14), and
the roller carrier (3) being mounted to be longitudinally movable on the pull rod (2),
wherein the pull rod (2) has a radially projecting first end-stop (6) against which the roller carrier (3) is pre-stressed.

2. The actuating element according to claim 1, wherein the pull rod (2) extends completely through the roller carrier (3).

3. The actuating element according to claim 1, wherein the first and the second rollers (13, 14) have respective rolling surfaces (17, 18) and the pull rod (2) extends centrally between the rolling surfaces (17, 18) of the first and the second rollers (13, 14).

4. The actuating element according to claim 1, wherein at least one of the first and the second rollers (13, 14) has a circumferential groove (19, 20) through which the pull rod (2) extends.

5. The actuating element according to claim 4, wherein the circumferential groove (19, 20) has a semicircular cross-section.

6. The actuating element according to claim 4, wherein the first roller (13) has a first circumferential groove (19) and the second roller (14) has a second circumferential groove (20) through which the pull rod (2) extends.

7. The actuating element according to claim 6, wherein the first circumferential groove (19) and the second circumferential groove (20) are arranged opposite one another.

8. The actuating element according to claim 7, wherein the first circumferential groove (19) and the second circumferential groove (20) are formed centrally in the rolling surfaces (17, 18) of the first and the second rollers (13, 14).

9. The actuating element according to claim 7, wherein a cross-section of the first circumferential groove (19) and the second circumferential groove (20), when conjoined, is essentially circular.

10. The actuating element according to claim 1, wherein the pull rod (2) has a radially projecting second end-stop (7), and a compression spring (23) is arranged between the second end-stop (7) and the roller carrier (3) and pre-stresses the roller carrier (3) against the first end-stop (6).

11. A transmission parking lock in combination with an actuating element (1) comprising a pull rod (2) and a roller carrier (3) on which are arranged a first roller (13) for rolling on a first rolling surface on a pivotable pawl of the parking lock and a second roller (14) for rolling on a second rolling surface on a guide element such that the roller carrier (3) is movable along a predetermined path in a longitudinal direction of the pull rod (2), the pull rod (2) extends between the first roller (13) and the second roller (14) and the roller carrier (3) is mounted to be longitudinally movable on the pull rod (2).

12. The transmission parking lock in combination with the actuating element (1) according to claim 11, wherein the parking lock (24) comprises a pivotable pawl (25) and a toothed parking-lock wheel (28), which is connected in a rotationally fixed manner to a drive output shaft (27) of a transmission, the pull rod (2) and the roller carrier (3) are movable from a first position, in which the drive output shaft (27) is unlocked, to a second position, in which the first roller (13) contacts the pawl (25) and the second roller (14) contacts a guide element (31) to bias the pawl (25) into engagement with the toothed parking-lock wheel (28).

13. The transmission parking lock in combination with the actuating element (1) according to claim 12, wherein a first rolling surface (32) is provided on the pawl (25) for the first roller (13) to roll on, and a second rolling surface (34) is provided on the guide element (31) for the second roller (14) to roll on.

14. The transmission parking lock in combination with the actuating element (1) according to claim 12, wherein the pawl (25) is pivotable about a pivot axis (26), and the roller carrier (3) is movable in an axial direction relative to the pivot axis (26) between the guide element (31) and the pawl (25), when the pull rod (2) is moved from the first position to the second position.

15. An actuating element for a parking lock of a transmission, the actuating element comprising:
 a pull rod (2) and a roller carrier (3) on which are arranged a first roller (13) for rolling on a rolling surface of a pivotable pawl of the parking lock and a second roller (14) for rolling on a mating rolling surface of a guide element such that the roller carrier (3) being movable along a predetermined path in a longitudinal direction of the pull rod (2);
 the pull rod (2) being located between the first roller (13) and the second roller (14);
 the roller carrier (3) being mounted so as to be longitudinally movable along the pull rod (2); and
 both the first roller (13) and the second roller (14) having a rod rolling surface which engages with and together sandwich the pull rod (2) therebetween and an exposed rolling surface, and the exposed rolling surface of the first roller (13) is arranged to directly engage with and roll along the rolling surface of a pivotable pawl (25) while the exposed rolling surface of the second roller (14) is arranged to directly engage with and roll along the mating rolling surface of a guide element (31).

16. The actuating element according to claim 15, wherein the pull rod (2) has a radially projecting first end-stop (6) against which the roller carrier (3) is pre-stressed.

* * * * *